(12) United States Patent
Adrian

(10) Patent No.: US 11,209,882 B2
(45) Date of Patent: Dec. 28, 2021

(54) MECHANICAL SELECTION OF POWER CONSUMPTION INDICATOR BY FORM FACTOR

(71) Applicant: Microsoft Technology Licensing, LLC, Redmond, WA (US)

(72) Inventor: Jason David Adrian, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 16/668,586

(22) Filed: Oct. 30, 2019

(65) Prior Publication Data

US 2021/0034124 A1    Feb. 4, 2021

Related U.S. Application Data

(60) Provisional application No. 62/880,956, filed on Jul. 31, 2019.

(51) Int. Cl.
*G06F 1/26* (2006.01)
*G06F 1/30* (2006.01)
(Continued)

(52) U.S. Cl.
CPC ............ *G06F 1/263* (2013.01); *G06F 1/30* (2013.01); *G06F 3/0626* (2013.01);
(Continued)

(58) Field of Classification Search
CPC ... G06F 1/20; G06F 1/26; G06F 1/263; G06F 1/30; G06F 3/0605; G06F 3/0625;
(Continued)

(56) References Cited

U.S. PATENT DOCUMENTS 5,132,875 A * 7/1992 Piesinger ............ H01L 23/4093
174/16.3
8,239,701 B2   8/2012 Day et al.
(Continued)

FOREIGN PATENT DOCUMENTS

CN    206411571 U    8/2017
WO    2016072968 A1   5/2016

OTHER PUBLICATIONS

"International Search Report and Written Opinion Issued in PCT Application No. PCT/US2020/036538", dated Oct. 2, 2020, 13 Pages.

*Primary Examiner* — Terrell S Johnson
(74) *Attorney, Agent, or Firm* — Holzer Patel Drennan

(57) ABSTRACT

A system for mechanically indicating a power consumption level is provided. The system includes a solid-state drive (SSD) device and a circuit board contained in the SSD device. The circuit board contains a power consumption capacity selector accessible from outside the SSD device wherein the power consumption capacity selector is configurable to open and close a circuit. The system further includes a mechanical structure configured to insert into the SSD device from outside the SSD device. The mechanical structure is positioned to contact the power consumption capacity selector and to open and close the circuit using the power consumption capacity selector.

20 Claims, 7 Drawing Sheets

(51) Int. Cl.
*G06F 3/06* (2006.01)
*G06F 1/20* (2006.01)

(52) U.S. Cl.
CPC .............. *G06F 3/0656* (2013.01); *G06F 1/20* (2013.01); *G06F 1/26* (2013.01); *G06F 3/0605* (2013.01); *G06F 3/0625* (2013.01); *G06F 3/0634* (2013.01); *G06F 3/0653* (2013.01); *G06F 3/0679* (2013.01)

(58) Field of Classification Search
CPC .... G06F 3/0626; G06F 3/0634; G06F 3/0653; G06F 3/0656; G06F 3/0679
See application file for complete search history.

(56) References Cited

U.S. PATENT DOCUMENTS

| | | | |
|---|---|---|---|
| 8,959,374 B2 | 2/2015 | Miller et al. | |
| 8,982,567 B2 | 3/2015 | Bang et al. | |
| 9,466,385 B1 | 10/2016 | Hayter et al. | |
| 9,971,534 B2 | 5/2018 | Starr | |
| 10,146,293 B2 | 12/2018 | Khatib et al. | |
| 2004/0064744 A1* | 4/2004 | German | G06F 1/26 713/300 |
| 2006/0050495 A1* | 3/2006 | Warner, II | H01R 29/00 361/786 |
| 2014/0376170 A1* | 12/2014 | Richard | G06F 1/203 361/679.32 |
| 2016/0085289 A1* | 3/2016 | Khatib | G06F 3/0679 713/320 |
| 2017/0139450 A1* | 5/2017 | Adrian | G06F 1/187 |
| 2017/0336855 A1 | 11/2017 | Ragupathi et al. | |

* cited by examiner

MECHANICAL SELECTION OF POWER CONSUMPTION INDICATOR BY FORM FACTOR

CROSS-REFERENCE

This application claims priority to U.S. Provisional Application No. 62/880,956, entitled "Mechanical Selection of Power Consumption Indicator by Form Factor" and filed on Jul. 31, 2019, the entire disclosure of which is incorporated herein by reference for all purposes.

BACKGROUND

Solid State Drives (SSDs) are storage devices containing nonvolatile flash memory. For datacenter environments, SSD products are available in different form factors, such as m.2 in various lengths, u.2, and E1.S and E1.L in 9.5 mm and 18 mm thick products, although there can be many different thicknesses employed in such datacenter environments. SSD products of different form factors are typically intended for installation in system device slots that correspond to the specific form factor. For example, a 9.5 mm SSD product is configured for installation in a slot intended for 9.5 mm SSDs, and an 18 mm SSD product is configured for installation in a slot intended for 18 mm SSD products. Moreover, different form factors typically also have different operating parameters, such as power consumption limits and heat dissipation capabilities. These disparate factors also contribute to the general lack of interchangeability between SSD form factors and system device slots.

This lack of interchangeability presents a cost problem for the datacenter—if the datacenter includes individual systems having different form factor slots, the datacenter is presented with the expensive proposition of maintaining an inventory of different form factor SSD products in anticipation of SSD product failures within the datacenter. This lack of interchangeability also discourages upgrading systems in the datacenter to newer form factors and technologies because a new form factor SSD products may not be configured to fit or operate in the legacy slots of legacy systems.

SUMMARY

The described technology provides a system for mechanically indicating a power consumption capacity of an electronic device. The system includes a circuit board containing a power consumption capacity selector accessible from outside the electronic device, the power consumption capacity selector being configurable to open and close a circuit on the circuit board. A mechanical actuator is configured to insert into the electronic device from outside the electronic device. The mechanical actuator is positioned to contact the power consumption capacity selector and to open and close the circuit using the mechanical actuator. The open/closed state of the circuit on the circuit board indicates the power consumption capacity.

A method of indicating a power consumption capacity of an electronic device is provided. The electronic device includes a circuit board contained within a case. A mechanical actuator is received into the case from outside the case. The mechanical actuator actuates a power consumption capacity selector on the circuit board inside the case. The open/closed state of a circuit on the circuit board of the electronic device is changed by the power consumption capacity selector. The open/closed state of the circuit indicates the power consumption capacity of the electronic device.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
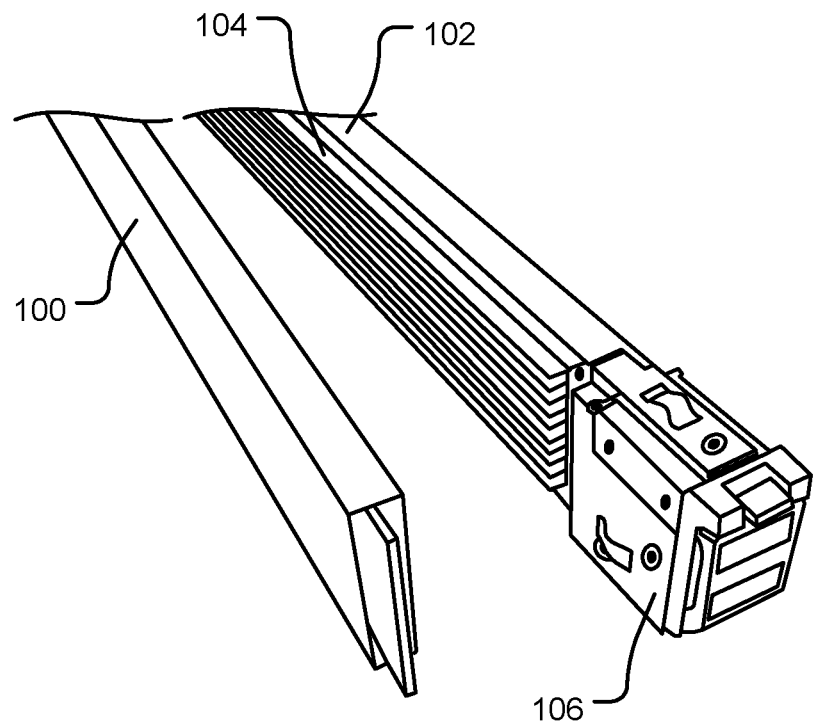
FIG. 1 illustrates a perspective view of a first example SSD device and a second example SSD device with an attached heatsink and an attached latch.

A 9.5 mm thick SSD device and an 18 mm thick SSD device are popular SSD device form factors, although other form factors are also employed in a computing system. However, individual computing systems are typically configured for one form factor or another (e.g., power capacity limits, slot size constraints). Accordingly, in a datacenter having computing systems configured for both form factors, the datacenter is faced with an inventory problem of maintaining surplus SSD device s of each form factor in order to respond quickly to SSD device failures in the field. Moreover, as new form factors are adopted, legacy SSD device s may no longer be usable in newer computing systems.

In another scenario, a thinner SSD device can take on a larger form factor by adding a heatsink, and yet neither the SSD device nor the computing system receives an indication of this change in form factor. Without this information, the SSD device itself may not know to draw more power from the computing system (which is may be able to support given the improved thermal capacity provided by the heatsink), and the computing system may not be able to accurately determine which kind of SSD device is installed without powering up the SSD device and asking it.

The described technology provides a unified SSD device design that can fit into EDSFF E1.L form factor and can be used in both a 9.5 mm and 18 mm width design while being automatically adjustable in accordance with appropriate power capacity limits. In one implementation, a removable heatsink can be keyed to convert between the form factors (e.g., enabling a 25 W with 9.5 mm or 40 W with 18 mm variant) and using this heatsink to signal the SSD controller which configuration it is in. With the larger heatsink attached (and its enhanced thermal capacity), the keying signals the SSD controller to enable 40 W power mode (e.g., to draw more power than the 25 W mode).

There are multiple implementation options for this automatic power capping. One implementation shown in the drawings uses one or more screw locations for the larger heatsink to control a GPIO to the SSD controller. This screw could depress a metal tab completing the circuit, or a switch, or other methods of completing the GPIO circuit. When the GPIO is triggered, it tells the controller to change the default power of 25 W and to enable the 40 W max. By always (initially) defaulting to 25 W, thermal issues of inadvertently enabling 40 W mode in a 25 W capable slot are avoided.

As another implementation, the mechanical selection can be applied by a latch mechanism to trigger the GPIO, as the 9.5 and 18 mm options use different latches due to their width. It should be understood that other power consumption capacity selectors may be employed and that the mechanical selection may be applied to electronic device other than SSDs, such as hard disk drives, graphics cards, I/O boards, etc.

The 9.5 mm and 18 mm SSD form factors and 25 W and 40 W power consumption capacities are provided as examples only. It should be understood that the described technology may be applied to any combination of electronic device form factors and/or power consumption capacities.

FIG. 1 illustrates a perspective view of a first example SSD device 100 and a second example SSD device 102 with an attached heatsink 104 and an attached latch 106. The first SSD device 100 provides a 9.5 mm SSD form factor. The second SSD device 102 provides an 18 mm SSD form factor with the heatsink 104. The heatsink 104 may also increase the thermal dissipation, thereby increasing the tolerable power consumption of the second SSD device 102. As such, in some configurations, a different form factor, attachment of one or more heatsinks, or other physical changes to the SSD device or its environment can result in a change in tolerable power consumption. Accordingly, using such a physical configuration-based indicator to make a mechanical selection to indicate the tolerable power consumption for such configurations can inform the SSD device to request more or less power from the host system to which it is attached. Furthermore, by associating the indication tightly with the physical configuration can avoid errors—if an SSD device does not have a heatsink attached, then the SSD device can set itself to receive a first power level; if the SSD device has one heatsink attached, then the SSD device can set itself to receive a second (higher) power level; if the SSD device has two heatsinks attached (or a larger heatsink attached), then the SSD device can set itself to receive a third (higher) power level, and so on.

In one implementation, the power consumption capacity is indicated by a selector in an electronic connection to ground or another reference voltage, actuated by a form-factor-related mechanical structure. For example, the selector may be aligned to a screw location for a screw that attaches the heatsink 104 to the second SSD device 102—when attached, the screw depresses a selector spring to close a circuit to ground or another reference voltage that indicates an 18 mm form factor and therefore a 40 W maximum power consumption, rather than a 25 W maximum power consumption.

In another example, the latch 106 is keyed, based on the form factor of the SSD device to which it connects. The latch 106 secures the second SSD device 102 into a PCI Express slot in a computing system and provides an electrical connection and a communication connection between the second SSD device 102 and the PCI Express bus. As such, when a latch for a 9.5 mm form factor is latched to the second SSD device 102, the latch does not depress the selector spring to close the circuit, and when a latch for an 18 mm form factor is latched to the second SSD device 102, the latch depresses the selector spring to close the circuit, indicating to the second SSD device 102 that it can support a 40 W maximum power consumption. With this indication, the second SSD device 102 can then pull more power from the computing system in which it is installed as compared to its thinner form factor configuration. Other variations on the physical configuration can result in different power consumption indications.

Figure 2:
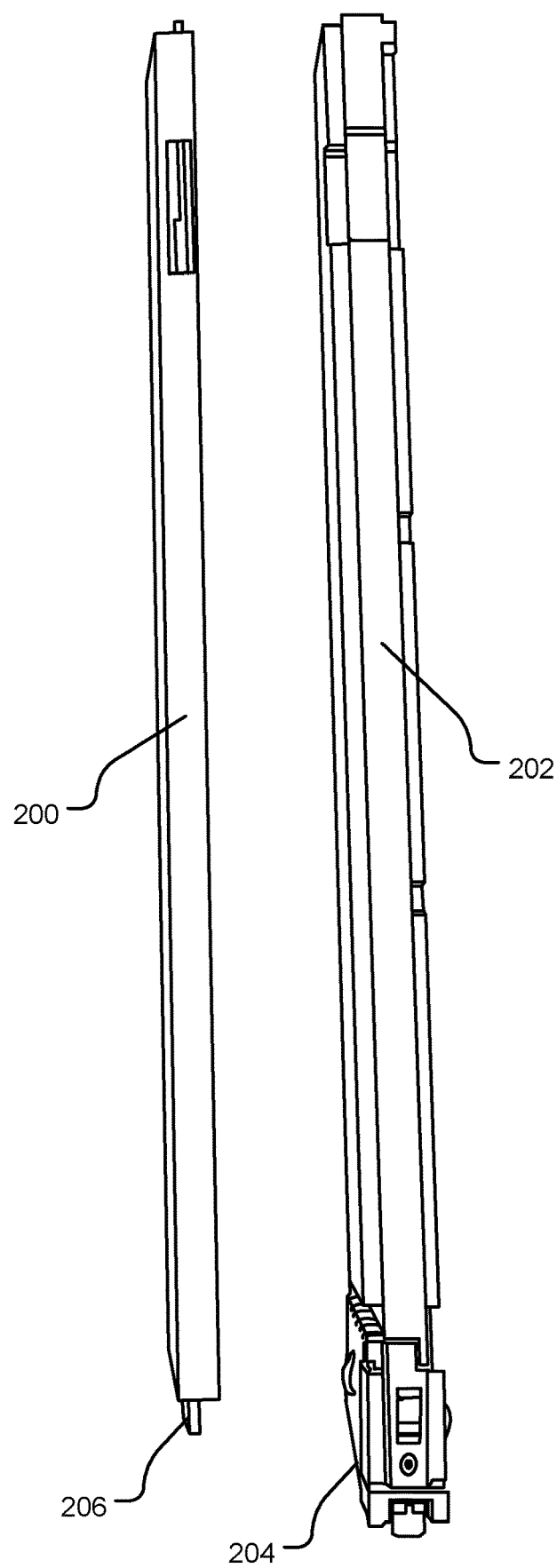
FIG. 2 illustrates another perspective view of a first example SSD device and a second example SSD device with an attached latch.

FIG. 2 illustrates another perspective view of a first example SSD device 200 and a second example SSD device 202 with an attached latch 204. The first SSD device 200 provides a 9.5 mm SSD form factor with a 25 W power consumption capacity. An SSD circuit board 206 is also positioned within the first SSD device 200 and is shown as extended out one end of the first SSD 200. This extended portion of the SSD circuit board 206 may be connected to a latch for connection to a system bus, such as a PCI Express bus. The second SSD device 202 provides an 18 mm SSD form factor with a 40 W power consumption capacity. As such, a different SSD form factor can represent a difference in tolerable power consumption. The power consumption capacity of the first SSD device 200 can be increased by adding a heatsink (not shown) because it can then dissipate the additional heat more effectively. However, without a selector, the first SSD device 200 has no indication that a heatsink has been attached and therefore does not register, request, or receive the increased power that it can then handle.

Because changes in power consumption capacity may result from attachment of a heatsink or other physical configuration changes, a physical configuration-based indicator, such as a mechanical indicator corresponding to a heatsink, can be used to indicate an increased/decreased power consumption capacity made available by the change in physical configuration. Using such a physical configuration-based indicator to make a mechanical selection to indicate the tolerable power consumption for such configurations can inform the SSD device to request more or less power from the host system to which it is attached. Furthermore, by associating the indication tightly with the physical configuration can avoid errors—if an SSD device does not have a heatsink attached, then the SSD device can set itself to receive a first power level; if the SSD device has one heatsink attached, then the SSD device can set itself to receive a second (higher) power level; if the SSD device has two heatsinks attached (or a larger heatsink attached), then the SSD device can set itself to receive a third (higher) power level, and so on.

In one implementation, the power consumption capacity is indicated by a selector in an electronic connection to ground or another reference voltage, actuated by a form-factor-related mechanical structure. For example, the selector may be aligned to a screw location for a screw that attaches the heatsink to the second SSD device 202—when attached, the screw depresses a selector spring to close a circuit to ground or another reference voltage that indicates a 40 W maximum power consumption (increased by the attachment of a heatsink), rather than a 25 W maximum power consumption.

In another example, a latch is keyed, based on the form factor of the SSD device to which it connects. The latch secures the first SSD device 200 into a PCI Express slot in a computing system and provides an electrical connection and a communication connection between the SSD circuit board 206 of the first SSD device 200 and the PCI Express bus. As such, when a latch for a 9.5 mm form factor is latched to the second SSD device 202, the latch does not depress the selector spring on the SSD circuit board 206 to close the circuit, and when a latch for an 18 mm form factor is latched to the second SSD device 202, the latch depresses the selector spring to close the circuit, indicating to the second SSD device 102 that it can support a 40 W maximum power consumption. With this indication, the second SSD device 102 can then pull more power from the computing system in which it is installed as compared to its thinner form factor configuration. Other variations on the physical configuration can result in different power consumption indications.

Figure 3:
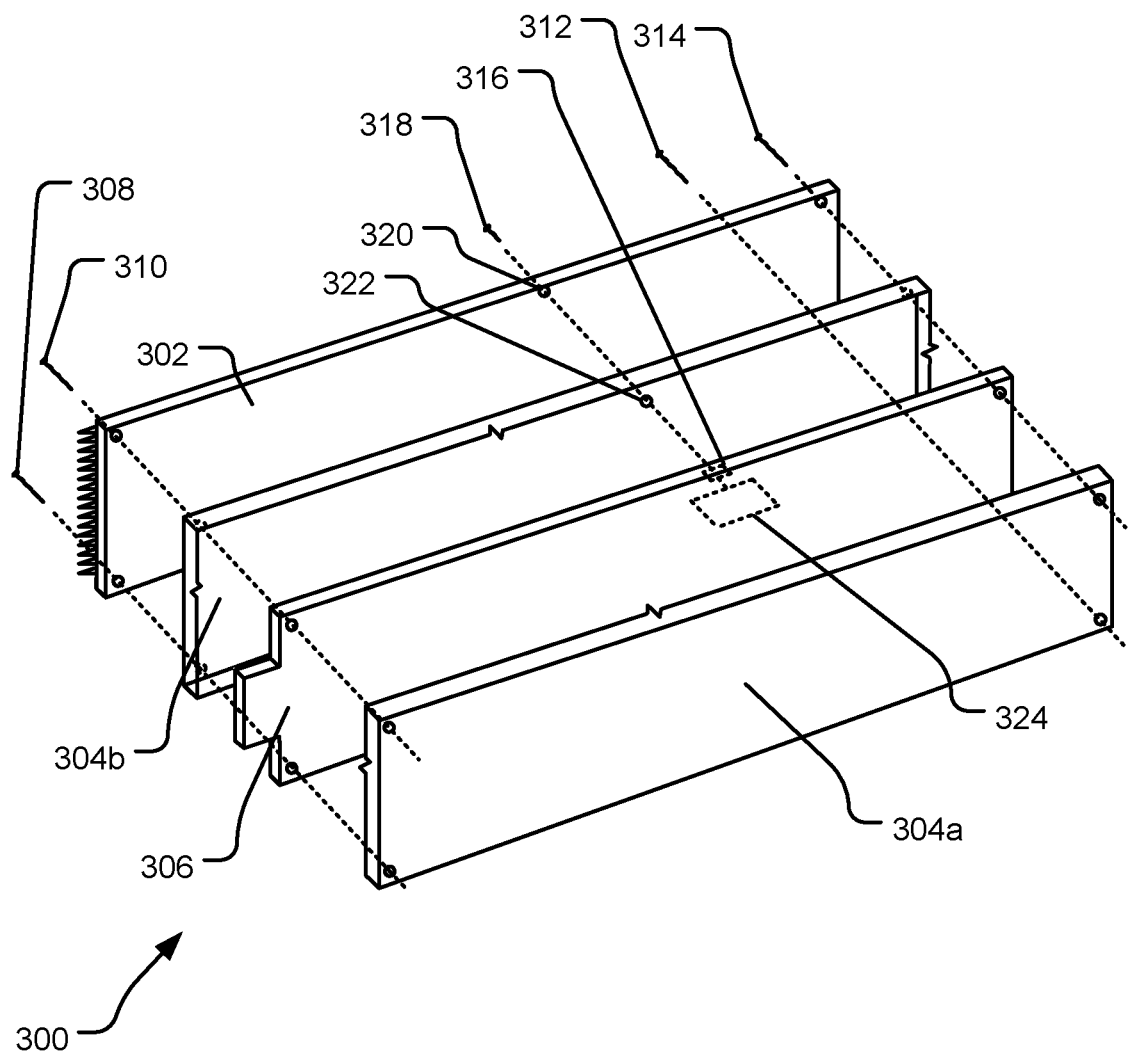
FIG. 3 illustrates an exploded view of an example SSD device with a heatsink showing screw hole alignment between the heatsink and the SSD device.

FIG. 3 illustrates an exploded view of an example SSD device 300 with a heatsink 302 showing screw hole alignment between the heatsink 302 and the SSD device 300. The SSD device 300 includes two halves 304*a* and 304*b* of an SSD casing 304. An SSD circuit board 306 is enclosed by the two halves 304*a* and 304*b* of the SSD casing 304. The heatsink 302, the SSD casing, and the enclosed SSD circuit board 306 are attached via screws 308, 310, 312, and 314, which are inserted from outside the SSD casing 304 through aligned screw holes, such that the heatsink 302, the SSD casing, and the enclosed SSD circuit board 306 are screwed together.

In addition, the enclosed SSD circuit board 306 includes a selector 316, which can be actuated by another screw 318 (an example mechanical actuator) inserted through a screw hole 320 in the heatsink 302 and a screw hole 322 in the SSD casing half 304*b*. If the screw 318 is screwed into the aligned screw holes 320 and 322, it mechanically contacts the selector 316, such as a leaf spring (not shown), and closes a circuit to ground or another reference voltage on the SSD circuit board 306. A power consumption controller circuit 324 is connected to the selector 316 and indicates different power consumption capacities, depending on whether the path to ground or another reference voltage is open or closed. The screw 318 is representative of the physical configuration of the SSD device 300 and the attached heatsink 302. As such, when the heatsink 302 is connected to the SSD device 300 using the screw 318, a signal on the SSD circuit board 306 is detected to indicate a higher power consumption capacity (by virtue of the attached heatsink 302) as compared to a configuration of the SSD device 300 without the heatsink 302 (in which the circuit to ground or another reference voltage is not closed).

It should be understood that various implementations may be employed. For example, more selector screws (e.g., screw 318) may be employed to indicate more than two power consumption capacities. Furthermore, the configuration-based mechanical actuator (e.g., the screw 318) may be embodied by a different structure, such as a post or pin extending from the heatsink 302 through the SSD case 304 to the power consumption capacity selector 316 on the SSD circuit board 306. Likewise, the power consumption capacity selector 316 may be a different type of structure, such as a pogo pin, a mechanically activated switch, a mechanically actuated relay, etc. In another implementation, the mechanical actuator itself may provide the path to ground or another reference voltage by contacting an electrical pad on the SSD circuit board 306. In this implementation, the mechanical actuator is represented by a screw, pin, etc. that is grounded or connected to another reference voltage (either inside or outside the SSD case 304, and the power consumption capacity selector 316 is represented by electrical pad on the SSD circuit board 306 to which the power consumption controller circuit 324 is connected.

In another implementation, latches (not shown) are configured to be used in slots corresponding to different SSD form factors. As such, rather than using a screw with screw holes through a heatsink and aligned with a power consumption capacity selector on the circuit board 306, the latches can be instrument such that a latch for a 9.5 mm SSD device does not include a mechanical actuator that closes a circuit to ground or another reference voltage with a power consumption capacity selector, whereas a latch for an 18 mm SSD device does include such a mechanical actuator, which indicates a higher power consumption capacity. As such, if a 9.5 mm SSD device has a heatsink attached to it, giving it enhanced power consumption capacity, the added size of the heatsink requires that it be installed with a latch for the larger form factor, which can indicate the larger power consumption capacity. Accordingly, the latch (or a mechanical actuator on the latch) provides a physical configuration based indicate of power consumption capacity that can be detected by the SSD device 300.

As shown, the configuration-based mechanical actuator (e.g., the screw 318) does not insert through the circuit board 306 or the other half 304*a* of the case 304, whereas the other screws are inserted through screw holes in the circuit board 306, the case 304, and the heatsink. In alternative implementation, the other screws may extend only through a set of aligned holes in the heatsink and the half 304*b* in the case 304, or indeed only through holes in the case 304. Other implementations are contemplated.

Figure 4:
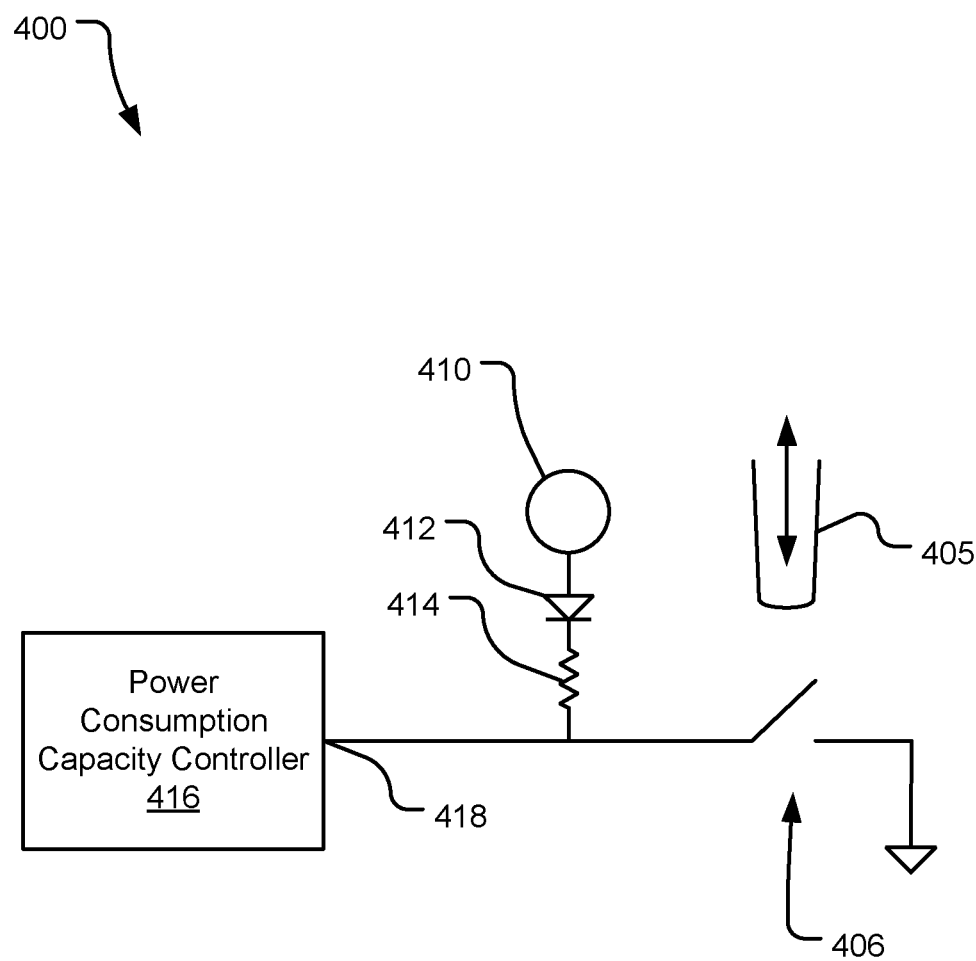
FIG. 4 illustrates a schematic of an example selector spring circuit.

FIG. 4 illustrates a schematic of an example selector spring circuit 400. The selector spring circuit 400 includes an example power consumption capacity selector 402, which is capable of closing a circuit to ground (or another reference voltage) via a power consumption capacity selector 406 (e.g., a switch). A voltage source 410 is coupled to the power consumption capacity selector 406 and a controller 416 (e.g., a GPIO circuit) through a diode 412 and a resistor 414. By closing the circuit (e.g., with a mechanical actuator 405) via the power consumption capacity selector 406, the controller 416 receives a signal on an input 418 that indicates a change in form factor and/or max power consumption capacity.

In one implementation, the controller 416, the voltage source 410, the diode 412 and the resistor 414 can reside inside the SSD device case, informing the SSD device of its possibly-altered form factor and/or max power consumption capacity based the mechanical selection of the power consumption capacity selector 406. In such an implementation, the mechanical actuator can be a screw, post, pin, etc. that is keyed to a heatsink attachment or a mechanical structure in a latch that engages with the SSD device in according to multiple form factors to indicate the power consumption capacity of the SSD device.

In another implementation, the controller 416, the voltage source 410, the diode 412 and the resistor 414 can reside outside the SSD device, such as in a latch or across the bus in the computing system, informing the computing system of the SSD's form factor and/or max power consumption capacity based on the mechanical selection of the power consumption capacity selector 406. In this implementation, the computing system can make this determination without powering up the SSD device. Other circuit configurations may also be employed.

Figure 5A:
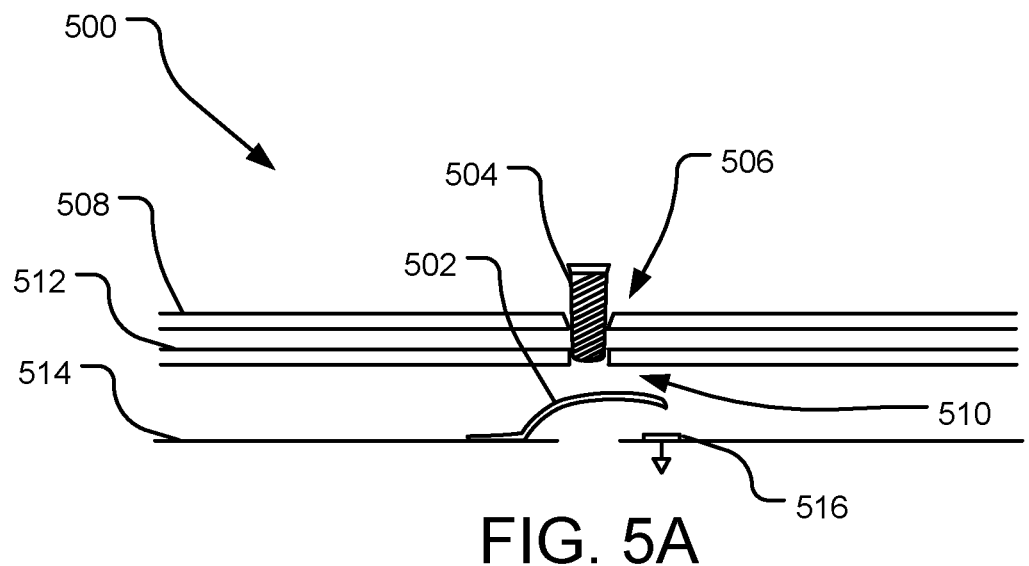
FIGS. 5A and 5B illustrate two views of mechanical selection using a selector spring and a screw.
Figure 5B:
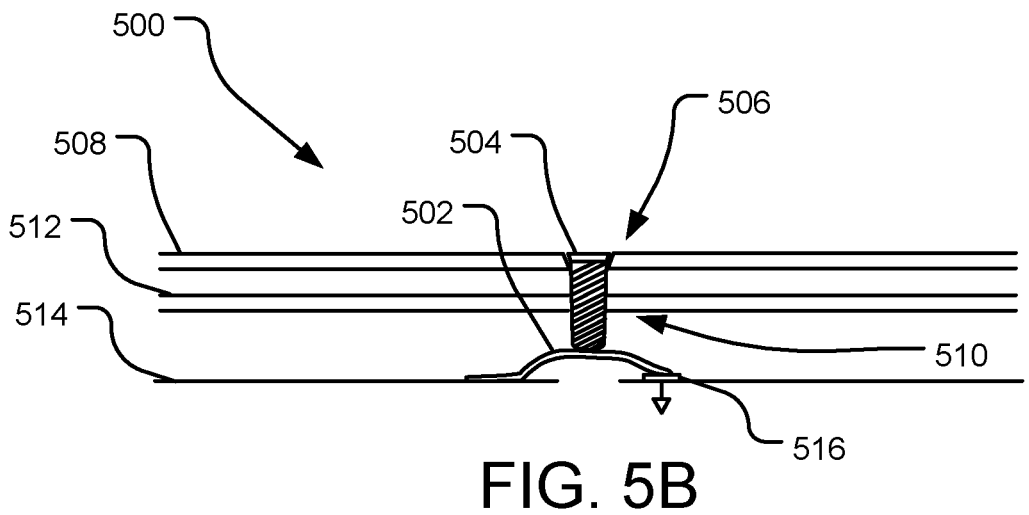

FIGS. 5A and 5B illustrate two views of mechanical selection using a selector spring 502 (an example mechanical selector) and a screw 504 (an example mechanical actuator). In the view of FIG. 5A, a screw 504 is inserted from outside an SSD device through a screw hole 506 of a heatsink 508 and a screw hole 510 of an SSD device case 512, but the screw 504 has not descended far enough toward the enclosed SSD circuit board 514 to depress the selector spring 502 and close the selector spring 502 against the grounded pad 516 (thereby failing to close the circuit). In some implementations, the pad may be connected to another reference voltage. In the illustrated implementation, this selector state indicates a smaller form factor and/or a lower max power consumption capacity. Note: The screw 504 need not be present to indicate this selector state—for example, if the screw 504 is absent, the selector spring 502 is not pressed against the grounded pad 516 to close the circuit. In some implementations, the pad may be connected to another reference voltage.

In the view of FIG. 5B, the screw 504 is inserted from outside an SSD device through a screw hole 506 of a heatsink 508 and a screw hole 510 of an SSD device case 512, and the screw 504 has descended far enough toward the enclosed SSD circuit board 514 to depress the selector spring 502 and close the selector spring 502 against the grounded pad 516 (thereby closing the circuit). In the illustrated implementation, this selector state indicates a larger form factor and/or a higher max power consumption capacity than that indicated in FIG. 5A. Such indications may differ for different systems.

Figure 6:
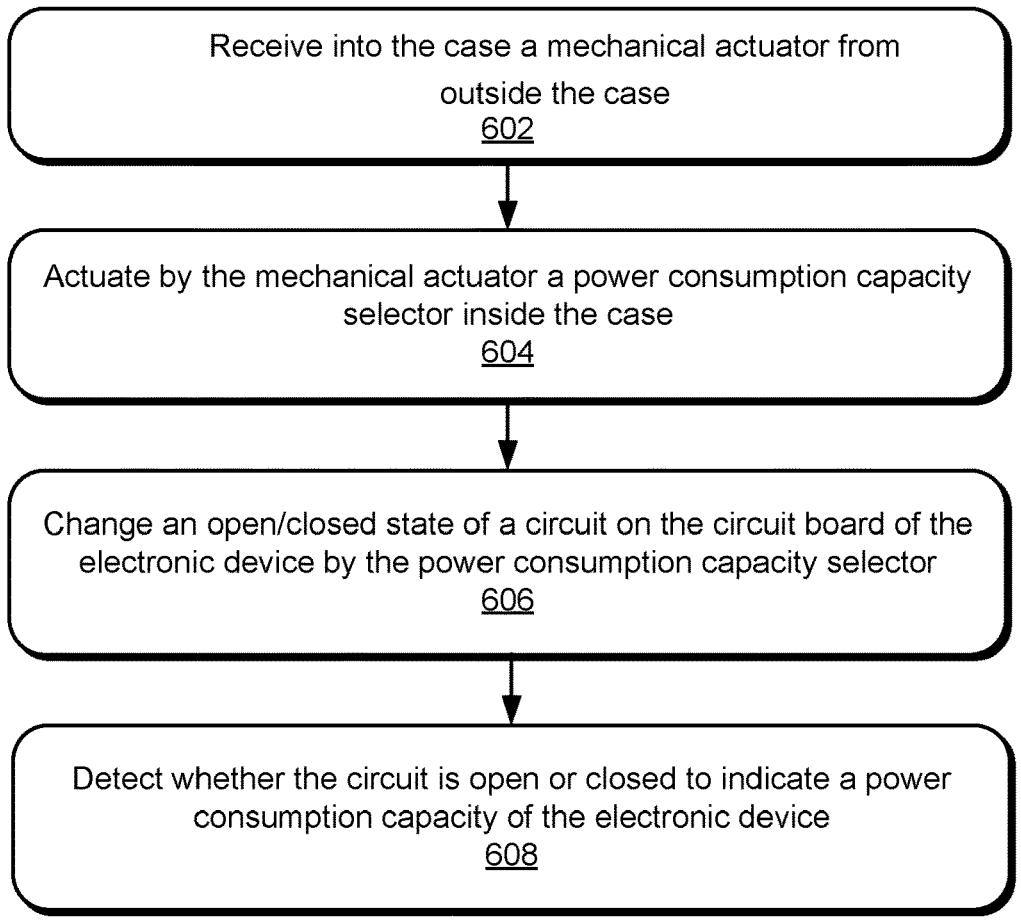
FIG. 6 illustrates example operations for indicating a power consumption capacity in an SSD device.

FIG. 6 illustrates example operations 600 for indicating a power consumption capacity in an SSD device. A receiving operation 602 receives a mechanical actuator from outside the case of an SSD device into the case of the SSD device. For example, a screw is inserted into a screw hole in the case. An actuation operation 604 actuates, by the mechanical actuator, a power consumption capacity selector positioned inside the case. For example, the screw and the associated screw hole(s) are aligned to contact a leaf spring on the circuit board.

A connection operation 606 changes an open/closed state of a circuit on the circuit board of the SSD device suing the power consumption capacity selector. For example, screwing the screw into the case extends the screw toward the leaf spring enough to close the circuit on the circuit board and removing the screw from the screw hole released the leaf spring so that it no longer closes the circuit. A detection operation 608 detects whether the circuit is open or closed to indicate a power consumption capacity for the SSD device. For example, if the circuit is open, a controller indicates that the power consumption capacity is that of a 9.5 mm form factor SSD device, whereas, if the circuit is closed, the controller indicates that the power consumption capacity is that of a 18 mm form factor SSD device.

In another example, a latch that is configured to latch to a 18 mm form factor SSD device includes a mechanical actuator that closes the circuit, whereas a latch that is configured to latch to a 9.5 mm form factor SSD device does not.

Power control software, executed by a processor or microcontroller may be employed to detect, communicate, and store detected power consumption capacities.

Figure 7:
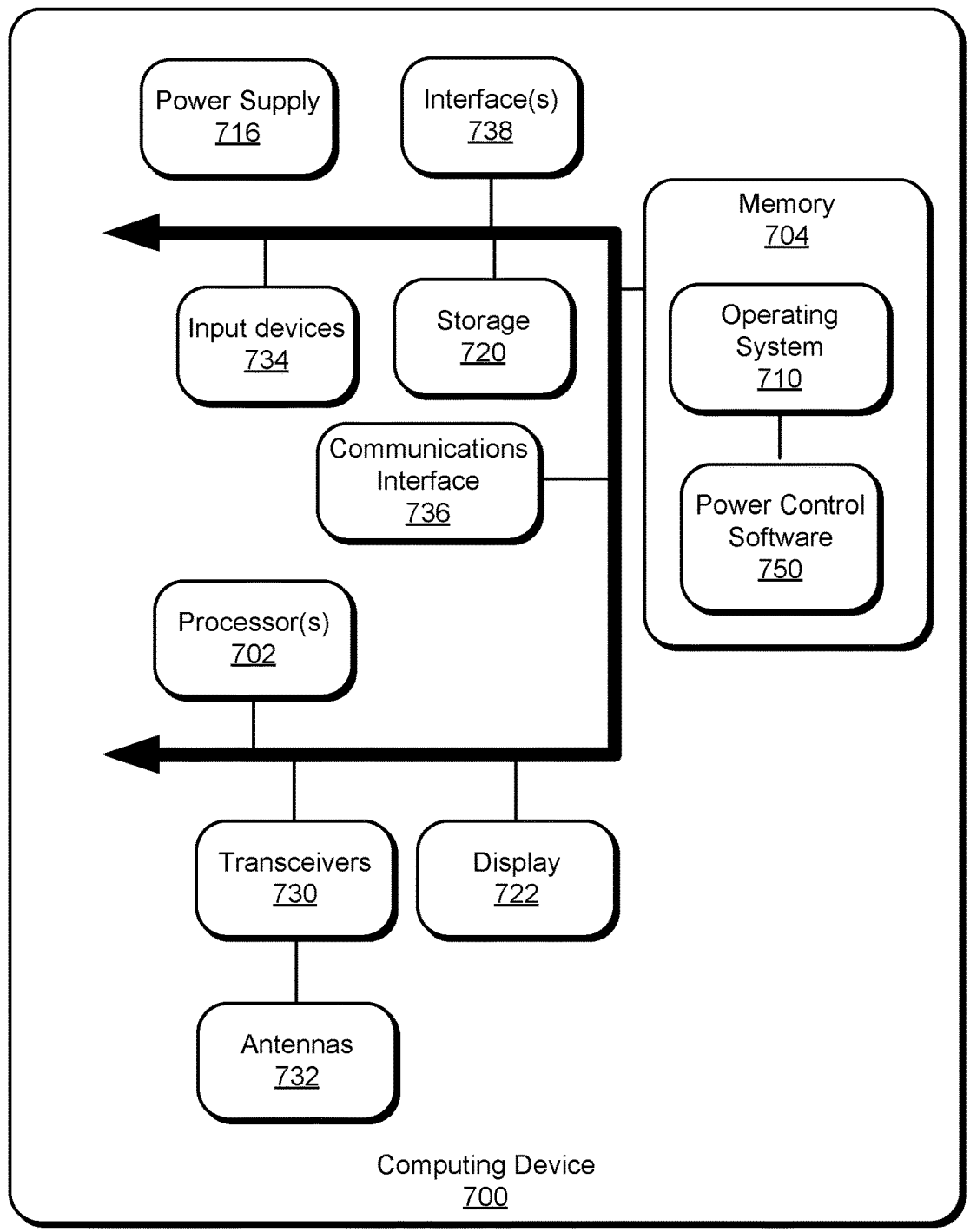
FIG. 7 illustrates an example computing device for implementing the features and operations of the described technology.

FIG. 7 illustrates an example computing device 700 for implementing the features and operations of the described technology. The computing device 700 is an example charging receiver device and may be a client device, such as a laptop, mobile device, desktop, tablet; a server/cloud device; internet-of-things device; an electronic accessory; or other chargeable electronic devices. The computing device 700 includes one or more processor(s) 702, and a memory 704.

The memory 704 generally includes both volatile memory (e.g., RAM) and non-volatile memory (e.g., flash memory). An operating system 710 resides in the memory 704 and is executed by the processor(s) 702.

In an example computing device 700, as shown in FIG. 7, one or more modules or segments, such as power control software 750, application modules, and other modules, are loaded into the operating system 710 on the memory 704 and/or storage 720 and executed by processor(s) 702. Power control software 750 in the computing device 700 can receive the mechanically selected signal from an installed SSD, store the form factor and/or max power capacity of the installed SSD, and report or otherwise act on this information, potentially without even powering up the SSD itself.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a network adapter 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

An example system for mechanically indicating a power consumption capacity of a solid-state drive (SSD) device is provided. The system includes a circuit board containing a power consumption capacity selector accessible from outside the SSD device. The power consumption capacity selector is configured to open and close a circuit on the circuit board. A mechanical actuator is configured to insert into the SSD device from outside the SSD device. The mechanical actuator is positioned to contact the power consumption capacity selector and to open and close the circuit using the mechanical actuator. The open/closed state of the circuit on the circuit board indicates the power consumption capacity of the SSD device.

Another example system of any preceding system is provided, wherein the SSD device includes a case enclosing the circuit board, and the mechanical actuator includes a screw inserted into the case to contact the power consumption capacity selector on the circuit board.

Another example system of any preceding system is provided, wherein the screw is configured to attach a heatsink to the SSD device.

Another example system of any preceding system is provided, wherein the screw is insertable through a screw hole in the heatsink and another screw hole in the case, and the screw hole in the heatsink and the screw hole in the case are aligned with the power consumption capacity selector on the circuit board.

Another example system of any preceding system is provided, wherein the SSD device includes a case enclosing the circuit board, and a latch includes the mechanical actuator to contact the power consumption capacity selector on the circuit board.

Another example system of any preceding system is provided, wherein the power consumption capacity selector includes a leaf spring.

Another example system of any preceding system further includes a controller connected to the power consumption capacity selector on the circuit board, and configured to detect whether the circuit is opened or closed.

An example system for mechanically indicating a power consumption capacity of an electronic device is provided. The system includes a circuit board containing a power consumption capacity selector accessible from outside the electronic device. The power consumption capacity selector is configured to open and close a circuit on the circuit board. A mechanical actuator is configured to insert into the electronic device from outside the electronic device. The mechanical actuator is positioned to contact the power consumption capacity selector and to open and close the circuit using the mechanical actuator. The open/closed state of the circuit on the circuit board indicates the power consumption capacity of the electronic device.

Another example system of any preceding system is provided, wherein the electronic device includes a case enclosing the circuit board, and the mechanical actuator includes a screw inserted into the case to contact the power consumption capacity selector on the circuit board.

Another example system of any preceding system is provided, wherein the screw is configured to attach a heatsink to the electronic device.

Another example system of any preceding system is provided, wherein the screw is insertable through a screw hole in the heatsink and another screw hole in the case, and the screw hole in the heatsink and the screw hole in the case are aligned with the power consumption capacity selector on the circuit board.

Another example system of any preceding system is provided, wherein the electronic device includes a case enclosing the circuit board, and a latch includes the mechanical actuator to contact the power consumption capacity selector on the circuit board.

Another example system of any preceding system is provided, wherein the power consumption capacity selector includes a leaf spring.

Another example system of any preceding system further includes a controller connected to the power consumption capacity selector on the circuit board and configured to detect whether the circuit is opened or closed.

An example method of indicating a power consumption capacity of an electronic device is provided. The electronic device includes a circuit board contained within a case. The method includes receiving into the case a mechanical actuator from outside the case, actuating by the mechanical actuator a power consumption capacity selector inside the case, and changing an open/closed state of a circuit on the circuit board of the electronic device by the power consumption capacity selector. The open/closed state of the circuit indicates the power consumption capacity of the electronic device.

Another example method of any preceding method is provided, wherein the mechanical actuator includes a screw inserted into the case to contact the power consumption capacity selector on the circuit board without being insert through a screw hole in the circuit board.

Another example method of any preceding method is provided, wherein the mechanical actuator includes a screw. The method further includes inserting the screw into the case to contact the power consumption capacity selector on the circuit board.

Another example method of any preceding method further includes attaching a heatsink to the electronic device by the screw.

Another example method of any preceding method is provided, wherein the screw is insertable through a screw hole in the heatsink and another screw hole in the case, and the screw hole in the heatsink and the screw hole in the case are aligned with the power consumption capacity selector on the circuit board.

Another example method of any preceding method further includes detecting whether the circuit is open or closed to indicate a power consumption capacity of the electronic device.

An example system of indicating a power consumption capacity of an electronic device is provided. The electronic device includes a circuit board contained within a case. The system includes means for receiving into the case a mechanical actuator from outside the case, means for actuating by the mechanical actuator a power consumption capacity selector inside the case, and means for changing an open/closed state of a circuit on the circuit board of the electronic device by the power consumption capacity selector. The open/closed state of the circuit indicates the power consumption capacity of the electronic device.

Another example system of any preceding system is provided, wherein the mechanical actuator includes a screw inserted into the case to contact the power consumption capacity selector on the circuit board without being insert through a screw hole in the circuit board.

Another example system of any preceding system is provided, wherein the mechanical actuator includes a screw. The system further includes means for inserting the screw into the case to contact the power consumption capacity selector on the circuit board.

Another example system of any preceding system further includes means for attaching a heatsink to the electronic device by the screw.

Another example system of any preceding system is provided, wherein the screw is insertable through a screw hole in the heatsink and another screw hole in the case, and the screw hole in the heatsink and the screw hole in the case are aligned with the power consumption capacity selector on the circuit board.

Another example system of any preceding system further includes means for detecting whether the circuit is open or closed to indicate a power consumption capacity of the electronic device.

A number of implementations of the described technology have been described. Nevertheless, it will be understood that various modifications can be made without departing from the spirit and scope of the recited claims.

What is claimed is:

1. A system for mechanically indicating a power consumption capacity of a solid-state drive (SSD) device, the system comprising:
   a circuit board in the SSD device containing a power consumption capacity selector accessible from outside the SSD device, the power consumption capacity selector being configured to open and close a circuit on the circuit board; and
   a mechanical actuator configured to insert into the SSD device from outside the SSD device, the mechanical actuator being positioned to contact the power consumption capacity selector on the circuit board and to open and close the circuit using the mechanical actuator, the open/closed state of the circuit on the circuit board indicating the power consumption capacity of the SSD device, wherein the mechanical actuator is configured to attach a heatsink to the SSD device.

2. The system of claim 1, wherein the SSD device includes a case enclosing the circuit board, and the mechanical actuator includes a screw inserted into the case to contact the power consumption capacity selector on the circuit board.

3. The system of claim 1, wherein the mechanical actuator includes a screw.

4. The system of claim 2, wherein the screw is insertable through a screw hole in the heatsink and another screw hole in the case, and the screw hole in the heatsink and the screw hole in the case are aligned with the power consumption capacity selector on the circuit board.

5. The system of claim 1, wherein the SSD device includes a case enclosing the circuit board, and a latch includes the mechanical actuator to contact the power consumption capacity selector on the circuit board.

6. The system of claim 1, wherein the power consumption capacity selector includes a leaf spring.

7. The system of claim 1, further comprising:
   a controller connected to the power consumption capacity selector on the circuit board and configured to detect whether the circuit is opened or closed.

8. A system for mechanically indicating a power consumption capacity of an electronic device, the system comprising:
   a circuit board in the electronic device containing a power consumption capacity selector accessible from outside the electronic device, the power consumption capacity selector being configured to open and close a circuit on the circuit board; and
   a mechanical actuator configured to insert into the electronic device from outside the electronic device, the mechanical actuator being positioned to contact the power consumption capacity selector on the circuit board and to open and close the circuit using the mechanical actuator, the open/closed state of the circuit on the circuit board indicating the power consumption capacity of the electronic device, wherein the mechanical actuator is configured to attach a heatsink to the electronic device.

9. The system of claim 8, wherein the electronic device includes a case enclosing the circuit board, and the mechanical actuator includes a screw inserted into the case to contact the power consumption capacity selector on the circuit board.

10. The system of claim 8, wherein the mechanical actuator is a screw.

11. The system of claim 9, wherein the screw is insertable through a screw hole in the heatsink and another screw hole in the case, and the screw hole in the heatsink and the screw hole in the case are aligned with the power consumption capacity selector on the circuit board.

12. The system of claim 8, wherein the electronic device includes a case enclosing the circuit board, and a latch includes the mechanical actuator to contact the power consumption capacity selector on the circuit board.

13. The system of claim 8, wherein the power consumption capacity selector includes a leaf spring.

14. The system of claim 8, further comprising:
a controller connected to the power consumption capacity selector on the circuit board and configured to detect whether the circuit is opened or closed.

15. A method of indicating a power consumption capacity of an electronic device, the electronic device including a circuit board contained within a case, the method comprising:
receiving into the case a mechanical actuator from outside the case;
actuating by the mechanical actuator a power consumption capacity selector inside the case; and
changing an open/closed state of a circuit on the circuit board of the electronic device by the power consumption capacity selector on the circuit board, the open/closed state of the circuit indicating the power consumption capacity of the electronic device, wherein the mechanical actuator is configured to attach a heatsink to the electronic device.

16. The method of claim 15, wherein the mechanical actuator includes a screw inserted into the case to contact the power consumption capacity selector on the circuit board without being insert through a screw hole in the circuit board.

17. The method of claim 15, wherein the mechanical actuator includes a screw and further comprising:
inserting the screw into the case to contact the power consumption capacity selector on the circuit board.

18. The method of claim 17, further comprising:
attaching the heatsink to the electronic device by the screw.

19. The method of claim 18, wherein the screw is insertable through a screw hole in the heatsink and another screw hole in the case, and the screw hole in the heatsink and the screw hole in the case are aligned with the power consumption capacity selector on the circuit board.

20. The method of claim 15, further comprising:
detecting whether the circuit is open or closed to indicate the power consumption capacity of the electronic device.

\* \* \* \* \*